United States Patent
Takai

(10) Patent No.: US 9,562,761 B2
(45) Date of Patent: Feb. 7, 2017

(54) POSITION MEASURING DEVICE

(71) Applicant: MITUTOYO CORPORATION, Kawasaki, Kanagawa (JP)

(72) Inventor: Toshihisa Takai, Kawasaki (JP)

(73) Assignee: MITUTOYO CORPORATION, Kawasaki (JP)

( * ) Notice: Subject to any disclaimer, the term of this patent is extended or adjusted under 35 U.S.C. 154(b) by 0 days.

(21) Appl. No.: 14/837,722

(22) Filed: Aug. 27, 2015

(65) Prior Publication Data
US 2016/0076877 A1 Mar. 17, 2016

(30) Foreign Application Priority Data
Sep. 12, 2014 (JP) ................................. 2014-185937

(51) Int. Cl.
G01B 11/14 (2006.01)
G01B 11/00 (2006.01)

(52) U.S. Cl.
CPC .................... *G01B 11/002* (2013.01)

(58) Field of Classification Search
CPC .............................. G01B 11/14; G01B 11/002
USPC .......................................................... 356/622
See application file for complete search history.

(56) References Cited

U.S. PATENT DOCUMENTS

| | | | | |
|---|---|---|---|---|
| 4,917,497 A | * | 4/1990 | Tomkins | G03H 1/00 356/457 |
| 4,921,352 A | * | 5/1990 | Adolfs | G03H 1/00 356/458 |
| 8,606,426 B2 | * | 12/2013 | Hwang | B82Y 35/00 250/201.2 |

FOREIGN PATENT DOCUMENTS

JP H06-185978 A 7/1994
JP 2002-139311 A 5/2002

* cited by examiner

*Primary Examiner* — Roy M Punnoose
(74) *Attorney, Agent, or Firm* — Oliff PLC

(57) ABSTRACT

A position measuring device of the invention includes a light emitter configured to emit a laser light, a hologram configured to generate a reconstructed image of an inclined surface relative to an optical axis, a light receiver disposed on a reconstructed image forming surface of the hologram, and a measurement unit configured to measure a position of an object based on a position of light received by the light receiver. In the position measuring device of the invention, the light emitter may emit a linear laser light and the light receiver may include an image sensor having a two-dimensional array of pixels.

6 Claims, 8 Drawing Sheets

POSITION MEASURING DEVICE

CROSS-REFERENCE TO RELATED APPLICATION

This non-provisional application claims priority under 35 U.S.C. §119(a) from Japanese Patent Application No. 2014-185937, filed on Sep. 12, 2014, the entire contents of which are incorporated herein by reference.

BACKGROUND

Technical Field

The present invention relates to a position measuring device that receives reflected and scattered light of a laser light with which a surface of an object is irradiated and measures a position on the surface of the object.

Related Art

A position measuring device is known in the art which irradiates a surface of a measurement object with a laser light, causes an image sensor to receive reflected and scattered light, and calculates a position on the surface of the measurement object using triangulation (e.g., see JP 2002-139311 A).

FIG. 8 is a schematic diagram illustrating a non-contact position measuring device using triangulation. As illustrated in FIG. 8, this position measuring device includes a light emitter 10 configured to emit a laser light LS1 toward a workpiece W to be measured and a light receiver 30 provided on an optical axis not parallel to an optical axis of the laser light LS1. The position measuring device also includes a projection lens 11 configured to concentrate the laser light LS1 emitted from the light emitter 10 and a light receiving lens 12 configured to image light reflected and scattered by the workpiece W on the light receiver 30. The respective placements and angles of the projection lens 11, the light receiving lens 12, and the light receiver 30 are determined according to the Scheimpflug principle.

In order for the position measuring device to measure a position of the workpiece W, the laser light LS1 is emitted from the light emitter 10 toward the workpiece W. The light receiver 30 then captures reflected and scattered light of the laser light LS1 on the workpiece W. Since the position measuring device has a disparity D between the light emitter 10 and the light receiver 30, a displacement L of the workpiece W is determined using triangulation based on position information Δx captured by the light receiver 30, a focal length f, and the disparity D.

JP 6-185978 A discloses a distance measuring device using a hologram. This distance measuring device uses a hologram that serves to image a plurality of points on the optical axis of light generated from a light source at another different points. In the distance measuring device, a light source emits light from the light source to a measurement object and a light detection unit detects light reflected from the measurement object and through the hologram. A distance on the optical axis of the measurement object is measured based on an imaging position of the light detected by the light detection unit.

SUMMARY OF THE INVENTION

The position measuring device disclosed in JP 2002-139311 A, however, is optically and structurally complex and increases its size because the distance measuring device needs to increase the focal length of the lens and is subject to constraints such as an angle of incidence on the light receiver according to the Scheimpflug principle. The distance measuring device disclosed in JP 6-185978 A is required to arrange a light detection unit, a hologram, and a measurement object in a straight line due to use of the hologram that images the points on the optical axis at another points. Thus, this device has only a small measuring range and is subject to various constraints on device configuration, and the device takes a lot of time to measure over a large area of the measurement object.

An object of the present invention is to provide a position measuring device capable of measuring a position on a surface of a measurement object in a short period of time with a simple and compact structure.

In order to solve the above problems, the position measuring device of the present invention includes a light emitter configured to emit a laser light, a hologram configured to generate a reconstructed image of an inclined surface relative to an optical axis, a light receiver disposed on a reconstructed image forming surface of the hologram, and a measurement unit configured to measure a position of an object based on a position of light received by the light receiver.

Such a configuration, in which the hologram is used to generate the inclined surface as a reconstructed image, can detect an image position of the inclined surface corresponding to a position of the object at which the laser light is incident when the light receiver receives through the hologram reflected and scattered light of the laser light with which a measurement object is irradiated. The measurement unit can determine the position of the object based on a correspondence between the position of the object on the optical axis and the image position detected by the light receiver.

In the position measuring device of the present invention, the light emitter may emit a linear laser light and the light receiver may include an image sensor having a two-dimensional array of pixels. Such a configuration, in which the image sensor receives through the hologram reflected and scattered light of the linear laser light with which the object is irradiated, can measure successive heights along an incident position of the laser light on the object.

The position measuring device of the present invention may further include a scanning unit configured to move a relative position between the laser light and the object in a direction perpendicular to a direction in which a line of the laser light extends. In such a configuration, the scanning unit scans the linear laser light with which the object is irradiated, allowing for measurement of a three-dimensional shape along the incident positions of the laser light on the object.

In the position measuring device of the present invention, the light emitter may emit a dot laser light and the light receiver may include a line sensor in which a plurality of pixels are arranged in a straight line. The position measuring device may further include a movable mirror that scans the laser light emitted from the light emitter over the object and adjusts an optical path such that scattered light of the laser light on the object is incident at a certain angle relative to the hologram and is imaged on the line sensor. Such a configuration, which scans the dot laser light using the movable mirror, can measure successive heights along incident positions of the laser light on the object.

The position measuring device of the present invention may further include a lens disposed between the hologram and the light receiver and expands the reconstructed image generated by the hologram. Such a configuration can detect a change in the image position under magnification when the light receiver receives through the hologram reflected and scattered light of the laser light with which the object is irradiated.

In the position measuring device of the present invention, the hologram may include a first area that reconstructs a first inclined surface inclined at a first angle relative to the optical axis and a second area that reconstructs a second inclined surface inclined at a second angle different from the first angle relative to the optical axis.

Such a configuration can change the range and resolution of position detection when the light receiver receives through the first area of the hologram reflected and scattered light of the laser light with which the object is irradiated and when the light receiver receives the reflected and scattered light of the laser light through the second area. That is, the closer the first and second angles are to being parallel to the optical axis, the larger the range of the position detection. On the other hand, the closer the first and second angles are to being perpendicular to the optical axis, the higher the resolution of the position detection. Accordingly, the range and resolution of the position detection can be selected depending on whether the reflected and scattered light of the laser light pass through the first area or the second area of the hologram.

DETAILED DESCRIPTION OF THE EMBODIMENTS

Figure 1:
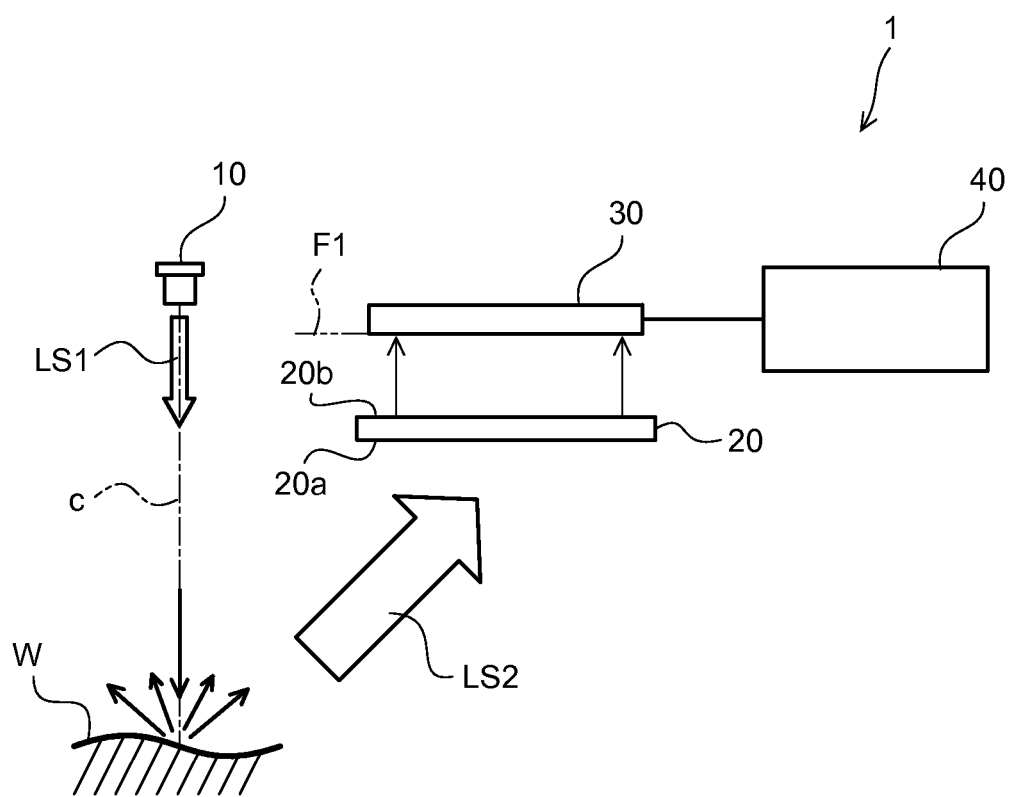
FIG. 1 is a configuration diagram illustrating a position measuring device according to a first embodiment.

Embodiments of the present invention will now be described with reference to the drawings. In the following, identical reference numerals denote the same elements and descriptions of the elements once described may be omitted.

First Embodiment

FIG. 1 is a configuration diagram illustrating a position measuring device according to a first embodiment.

As illustrated in FIG. 1, a position measuring device 1 according to the present embodiment includes a light emitter 10, a hologram 20, a light receiver 30, and a measurement unit 40. The position measuring device 1 irradiates a workpiece W as an object with a laser light LS1 and receives light reflected and scattered by a surface of the workpiece W (hereinafter referred to as "detection light LS2"). Thus, the position measuring device 1 measures a position on the surface of the workpiece W at which the laser light LS1 is incident in a non-contact manner.

The light emitter 10 has a laser light source configured to emit the laser light LS1. The light emitter 10 emits the laser light LS1 toward the workpiece W during measurement.

The hologram 20 is positioned at a position where the hologram 20 does not intercept the optical axis c of the laser light LS1 emitted from the light emitter 10. The hologram 20 generates an inclined surface relative to the optical axis c of the laser light LS1 as a reconstructed image. That is, irradiating the hologram 20 with reconstruction illumination light reveals an image of a predetermined inclined surface on a reconstructed image forming surface F1 of the hologram 20.

The light receiver 30 includes an image sensor having a two-dimensional array of pixels or a line sensor having a one-dimensional array of pixels. A charge-coupled device (CCD), a complementary metal-oxide semiconductor (CMOS) and the like are used as an image sensor and a line sensor. The light receiver 30 is disposed on the reconstructed image forming surface F1 of the hologram 20.

The hologram 20 has a first surface 20a on the workpiece W side and a second surface 20b opposite the workpiece W. In the present embodiment, the light receiver 30 is disposed on the second surface 20b side of the hologram 20. This allows the light receiver 30 to detect light of an image formed by light passing through the hologram 20 (i.e., a reconstructed image).

The measurement unit 40 measures a position of the workpiece W based on a position of light received by the light receiver 30. The position of the workpiece W refers to a position (or height) along the optical axis c of the laser light LS1. An incident position of the detection light LS2 reflected and scattered by the surface of the workpiece W on the hologram 20 is different depending on a position on the surface of the workpiece W on the optical axis c of the laser light LS1. That is, the position of the reconstructed image of the hologram 20 using the detection light LS2 reflected and scattered by the surface of the workpiece W is different when a distance between the workpiece W and the light emitter 10 is small compared to when a distance therebetween is large. Thus, the measurement unit 40 determines a position (or height) of the workpiece W from the position of the light received by the light receiver 30 based on a correspondence between the position (or height) of the workpiece W and the position of the light received by the light receiver 30.

In this manner, the light receiver 30, which receives the detection light LS2 through the hologram 20 configured to generate the reconstructed image of the inclined surface, can detect a position of the image (i.e., an image position) of an inclined surface corresponding to a position of the workpiece W at which the laser light LS1 is incident. In the configuration of the present embodiment, the incident position of the laser light LS1 on the workpiece W (i.e., a position at which the reflected and scattered light is generated) may be considered to be an emission position of the reconstruction illumination light for the hologram 20. Therefore, the same image as when the reconstruction illumination light is emitted from the incident position of the laser light LS1 on the workpiece W appears on the reconstructed image forming surface F1 of the hologram 20. This image appears as a dot image of the inclined surface corresponding to the incident position in the case of a dot laser light LS1 and appears as a line image of the inclined surface corresponding to the incident position in the case of a linear laser light LS1. The image appears at a position of the inclined surface corresponding to the position (or height) of the workpiece W on the optical axis c. This property allows the measurement unit 40 to determine the position (or height) of the workpiece W on the optical axis c based on the position of the light received by the light receiver 30.

The position measuring device 1 according to the present embodiment, which measures the position of the workpiece W using the hologram 20 configured to generate the reconstructed image of the inclined surface, can be small-sized compared to a configuration having lenses arranged based on the Scheimpflug principle. The use of the hologram 20 generating the reconstructed image of the inclined surface enables an area corresponding to the inclined surface to be measured and, thus, a wide range of the area can be measured in a short period of time.

A method of manufacturing the hologram 20 is then described.

Figure 2:
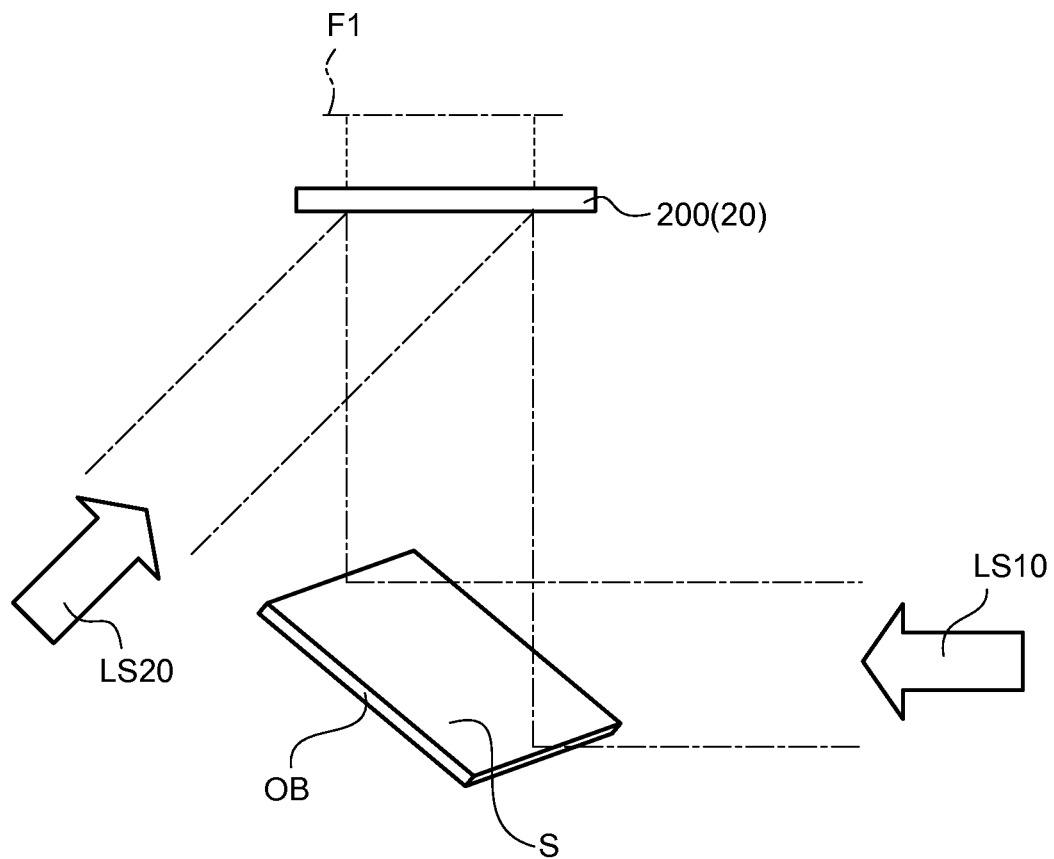
FIG. 2 is a schematic diagram illustrating a method of manufacturing a hologram.

FIG. 2 is a schematic diagram illustrating a method of manufacturing a hologram.

In order to manufacture the hologram 20 used in the position measuring device 1 according to the present embodiment, an object OB having an inclined surface S is disposed opposite a recording medium 200 for use as the hologram 20. Subsequently, the object OB is irradiated with a laser light LS10 for use as an object beam and the recording medium 200 is irradiated with a laser light LS20 for use as a reference beam. This causes the laser light LS10 reflected by the inclined surface S of the object OB to interfere with the laser light LS20 for use as the reference beam. Interference fringes due to this interference are recorded on the recording medium 200. Thus, the hologram 20 is manufactured. The hologram 20 can also be manufactured by a method other than that described above, for example by a method of digitally fabricating it using a computer.

A method of measuring a position of a workpiece W using the position measuring device 1 according to the present embodiment is then described.

Figure 3A:
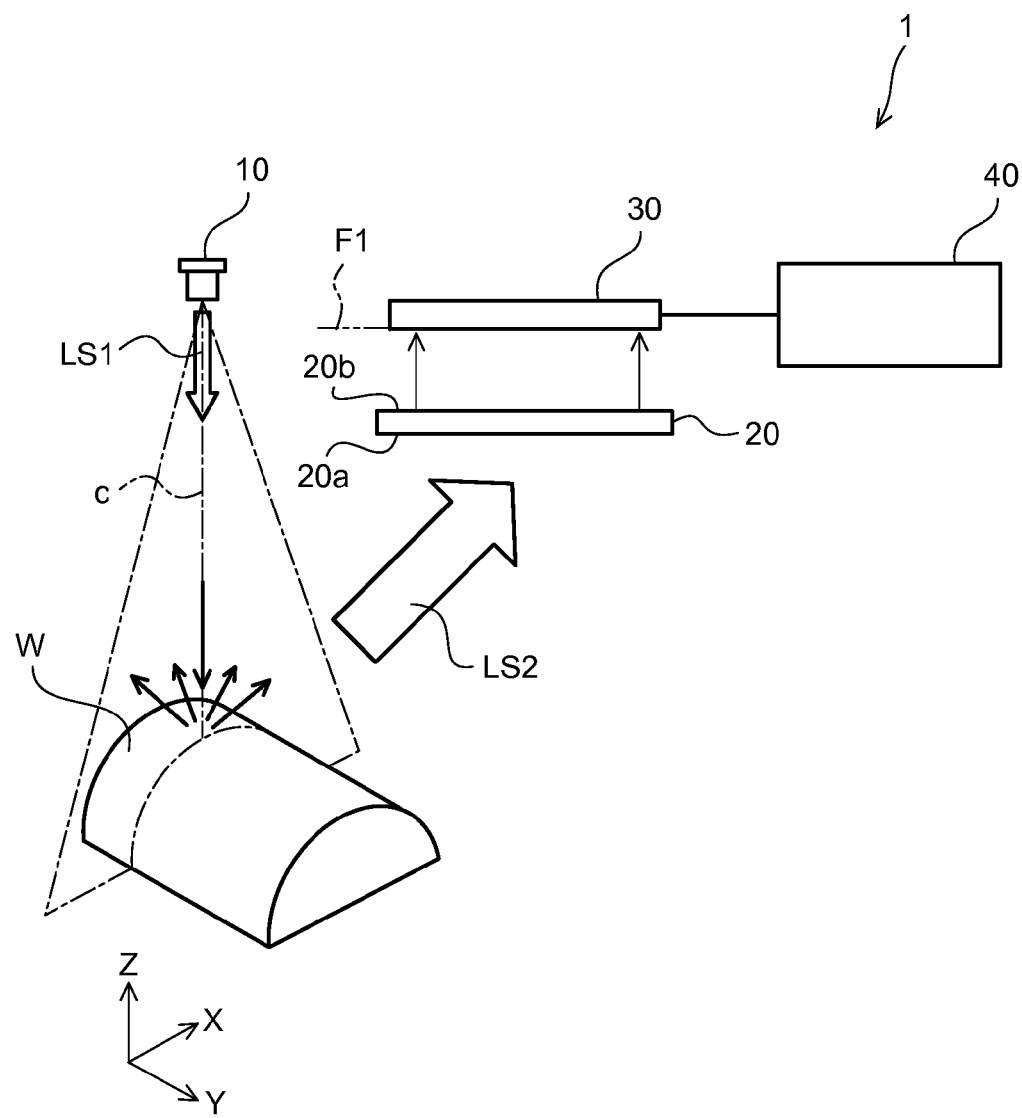
FIG. 3A is a schematic diagram illustrating measurement by a position measurement method and FIG. 3B is a schematic diagram illustrating an example of a received light signal in the position measurement method.
Figure 3B:
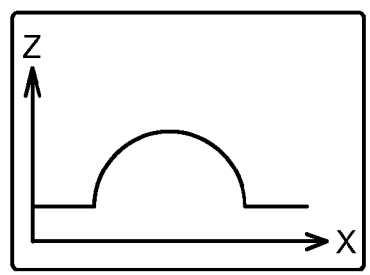

FIG. 3A is a schematic diagram illustrating measurement by a position measurement method. FIG. 3B is a schematic diagram illustrating an example of a received light signal in the position measurement method. Here, an image sensor is used as an example of the light receiver 30.

First, as illustrated in FIG. 3A, the position measuring device 1 according to the present embodiment is prepared, and a workpiece W is positioned on the optical axis c of the laser light LS1. The light emitter 10 then irradiates a surface of the workpiece W with the laser light LS1, where the laser light LS1 may be either a dot or a linear laser light. In the case of the dot laser light LS1, the position of the workpiece W relative to the laser light LS1 is varied. This allows for scanning by the laser light LS1.

The light receiver 30 captures through the hologram 20 detection light LS2 formed by the laser light LS1 reflected and scattered by the surface of the workpiece W while the surface of the workpiece W is being irradiated with the laser light LS1. The light receiver 30 detects a position of light after having passed through the hologram 20, which position varies depending on an incident position of the detection light LS2 on the hologram 20. Specifically, a change in position of the surface of the workpiece W irradiated with the laser light LS1 along the optical axis c is converted to a change in position along the inclined surface of the reconstructed image of the hologram 20.

Subsequently, the measurement unit 40 determines a position (or height) of the workpiece W based on the position of the light captured by the light receiver 30. The position of the light (i.e., the position of the inclined surface) captured by the light receiver 30 corresponds to a position on the optical axis c of the workpiece W. The measurement unit 40 determines the position of the workpiece W based on their correspondence.

In the example shown in FIG. 3A, the workpiece W has a semi-cylindrical surface to be measured, where the width direction of the semi-cylinder is referred to as an X direction, the extension direction of the semi-cylinder is referred to as a Y direction, and the height direction of the semi-cylindrical surface is referred to as a Z direction. For a dot laser light LS1, the laser light LS1 is scanned in the X direction. For a linear laser light LS1, the linear laser light LS1 extending in the X direction is emitted.

When the light receiver 30 captures through the hologram 20 the detection light LS2 formed by reflection and scattering of the laser light LS1 with which the surface of the workpiece W has been irradiated, an image position of the X direction of the workpiece W appears in a first direction of the image sensor and an image position of the Z direction of the workpiece W appears in a second direction perpendicular to the first direction.

FIG. 3B illustrates an example of a signal received by the image sensor. This signal represents the height at a position at which the laser light LS1 is incident on the workpiece W. The signal received by the image sensor is a signal obtained by converting the coordinates of the detection light LS2 through the inclined surface in the reconstructed image of the hologram 20. Thus, a shape corresponding to a cross-section at the position of the workpiece W at which the laser light LS1 is incident is obtained based on such a light receiving position on the image sensor.

An example of a specific device configuration is then described.

Figure 4:
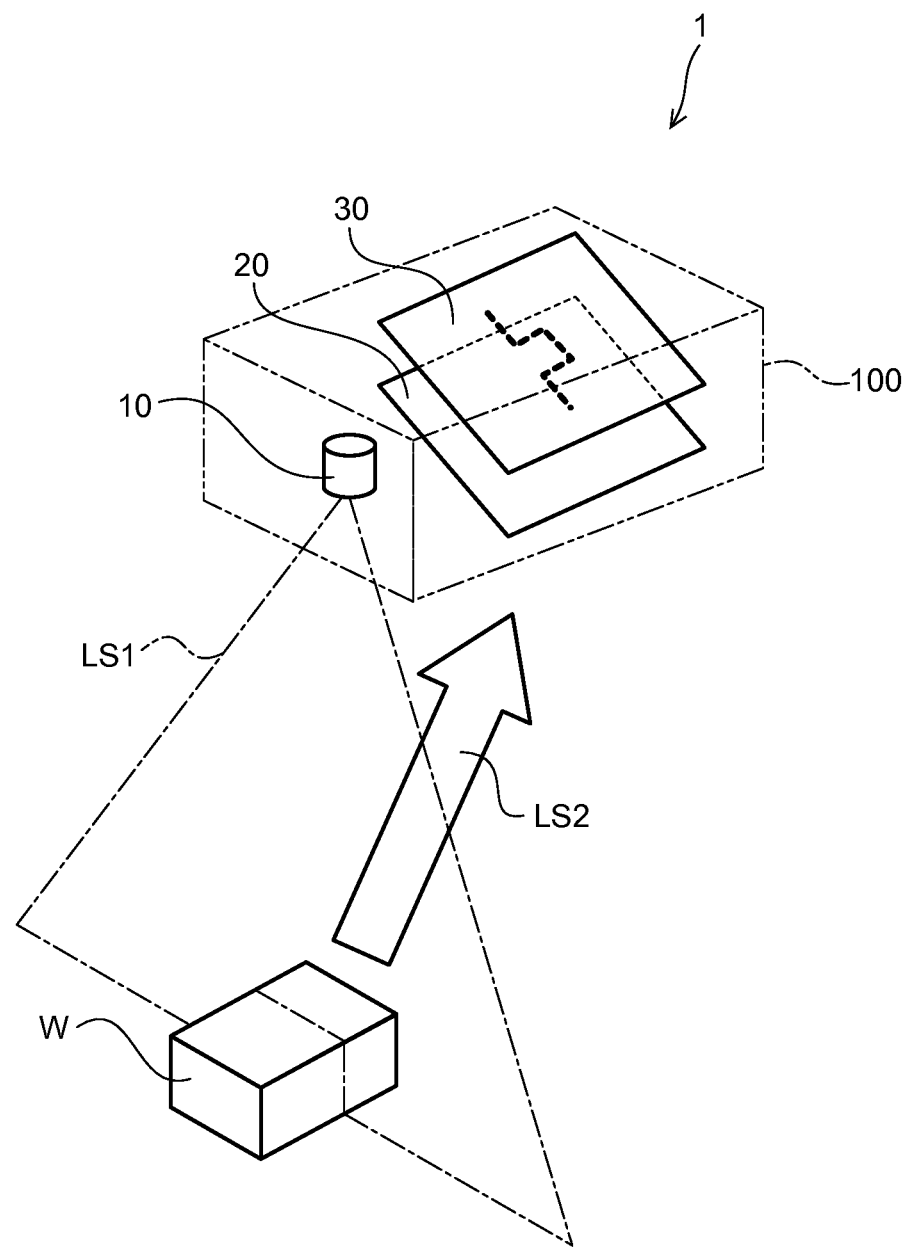
FIG. 4 is a schematic diagram illustrating an example of a device configuration using an image sensor.

FIG. 4 is a schematic diagram illustrating an example of a device configuration using an image sensor.

In the device configuration shown in FIG. 4, the light emitter 10, the hologram 20, and the light receiver 30 of the position measuring device 1 according to the present embodiment are received in a measuring head 100. The light emitter 10 emits a linear laser light LS1 toward a workpiece W. The hologram 20 is disposed on the workpiece W side in the measuring head 100, and the image sensor of the light receiver 30 is disposed opposite the workpiece W across the hologram 20 in the measuring head 100.

In this device configuration, the light emitter 10 emits the linear laser light LS1 to the workpiece W, and the image sensor of the light receiver 30 captures reflected and scattered detection light LS2 through the hologram 20. This allows the image sensor to detect a change in a position (or height) of the surface of the workpiece W at which the linear laser light LS1 is incident in two dimensions.

Here, the device configuration shown in FIG. 4 may include a scanning unit (not shown) configured to change a relative position between the measuring head 100 and the workpiece W. The scanning unit changes the relative position between the measuring head 100 and the workpiece W in a direction perpendicular to the line direction of the laser light LS1. The light emitter 10 irradiates the workpiece W with the linear laser light LS1 and the image sensor detects the height, where the scanning unit changes the relative position between the measuring head 100 and the workpiece W sequentially so that the three-dimensional shape of the surface of the workpiece W can be obtained.

Figure 5:
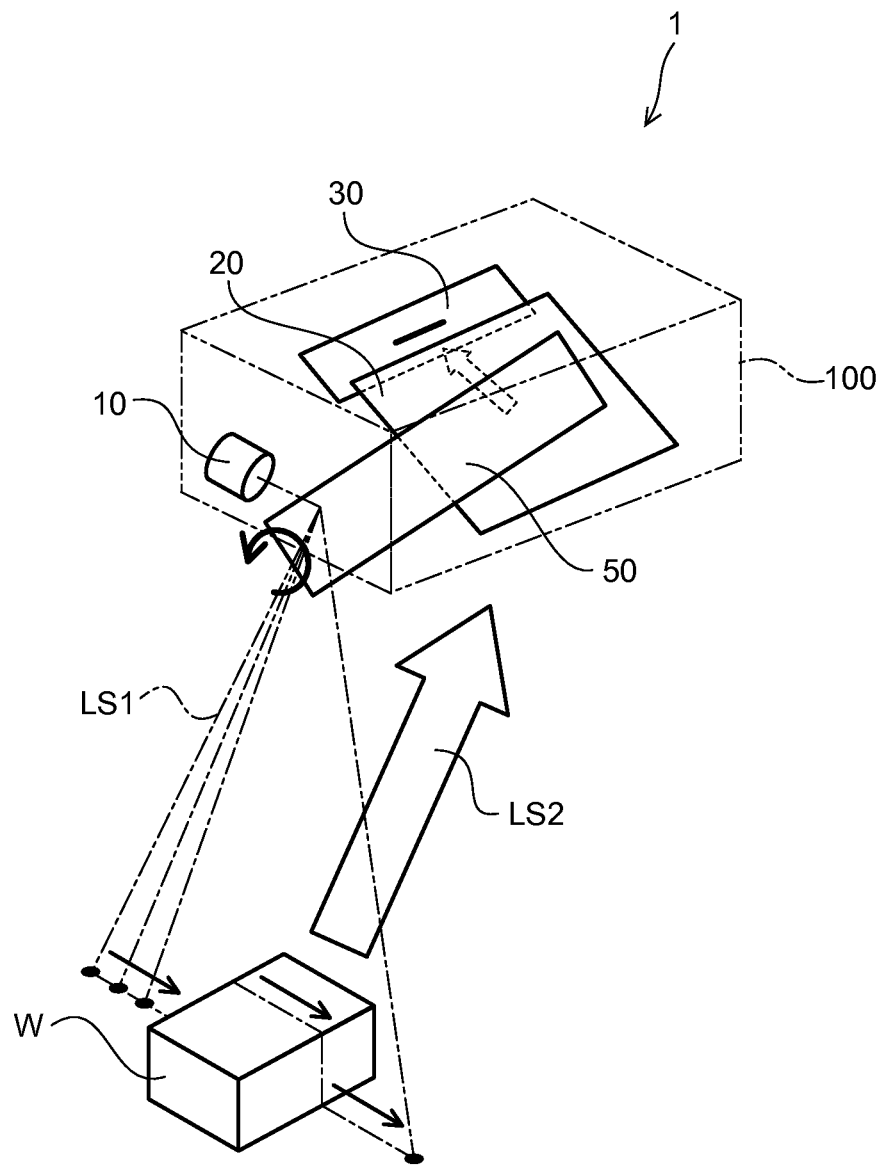
FIG. 5 is a schematic diagram illustrating an example of a device configuration using a line sensor.

FIG. 5 is a schematic diagram illustrating an example of a device configuration using a line sensor.

In the device configuration shown in FIG. 5, the light emitter 10, the hologram 20, and the light receiver 30 of the position measuring device 1 according to the present embodiment are received in the measuring head 100. The light receiver 30 includes a line sensor. The measuring head 100 is provided with a galvanometer mirror 50 configured to change the direction of reflection of light while rotating.

In this device configuration, the light emitter 10 emits a dot laser light LS1. The dot laser light LS1 is reflected by the galvanometer mirror 50 and is incident on the surface of the workpiece W. Since the rotation of the galvanometer mirror 50 changes the direction of reflection of the laser light LS1, the dot laser light LS1 can be moved (scanned) in one direction along the surface of the workpiece W.

Detection light LS2 formed by reflection and scattering of the laser light LS1 with which the surface of the workpiece W has been irradiated is reflected by the galvanometer mirror 50 and directed to the hologram 20. The rotation of the galvanometer mirror 50 changes an incident position of the laser light LS1 on the workpiece W and an angle of the detection light LS2 reflected by the galvanometer mirror 50 also changes associated with a change in the incident position. Thus, if a height of the incident position of the laser light LS1 on the workpiece W is constant, the position of the detection light LS2 directed from the galvanometer mirror 50 to the hologram 20 will always be the same. On the other hand, if the height of the incident position of the laser light LS1 on the workpiece W varies, the position of the detection light LS2 directed to the hologram 20 varies along the axial direction corresponding to a height axis.

The detection light LS2 incident on the hologram 20 passes through the hologram 20 and is captured at a predetermined position of the line sensor of the light receiver 30. In this device configuration, a change in height of the workpiece W is reflected in the light receiving position of the line sensor. Therefore, the height at the positions on the workpiece W on which the dot laser light LS1 is scanned can be determined based on the position of light captured by the line sensor.

The device configuration shown in FIG. 5 may also include a scanning unit (not shown) configured to change a relative position between the measuring head 100 and the workpiece W. The scanning unit changes the relative position between the measuring head 100 and the workpiece W in a direction perpendicular to the scanning direction of the laser light LS1. The rotation of the galvanometer mirror 50 causes the dot laser light LS1 to be directed to the workpiece W and the line sensor to detect the height, where the scanning unit changes the relative position between the measuring head 100 and the workpiece W sequentially. Thus, the three-dimensional shape of the surface of the workpiece W can be obtained.

Second Embodiment

A position measuring device according to a second embodiment will now be described.

Figure 6A:
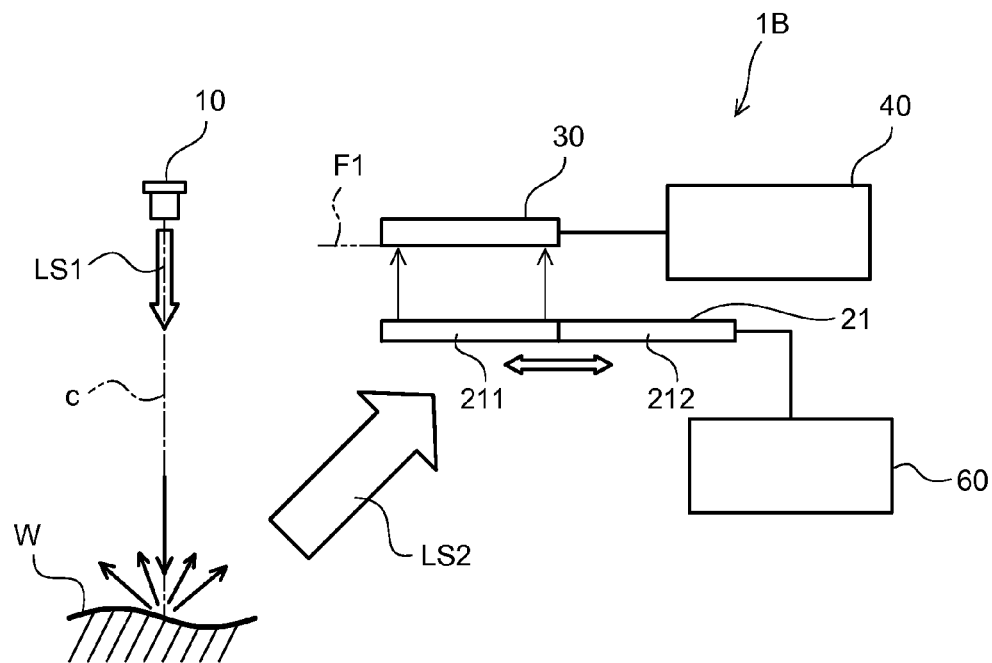
FIGS. 6A and 6B are configuration diagrams illustrating a position measuring device according to a second embodiment.
Figure 6B:
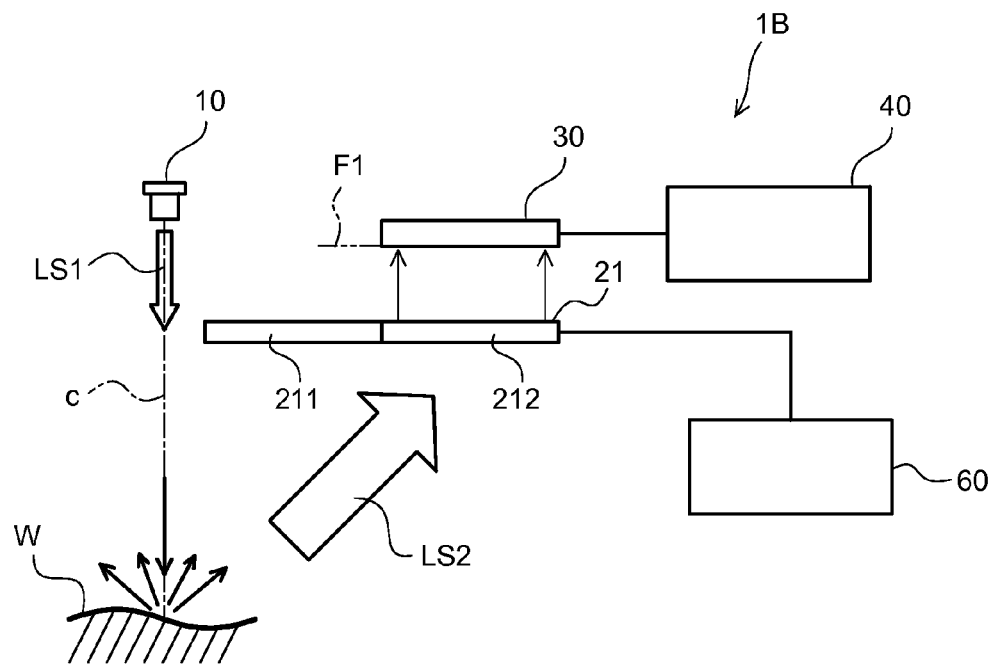

FIGS. 6A and 6B are configuration diagrams illustrating a position measuring device according to the second embodiment.

As illustrated in FIGS. 6A and 6B, a position measuring device 1B according to the present embodiment is different from the position measuring device 1 according to the first embodiment in the configuration of a hologram 21. The position measuring device 1B also includes a drive mechanism 60 for the hologram 21. Other configurations are the same as the position measuring device 1.

The hologram 21 used in the position measuring device 1B has a first area 211 and a second area 212. The first area 211 is an area that generates a first inclined surface inclined at a first angle relative to the optical axis c of the laser light LS1 as a reconstructed image. The second area 212 is an area that generates a second inclined surface inclined at a second angle different from the first angle relative to the optical axis c of the laser light LS1 as a reconstructed image. That is, the hologram 21 has a plurality of areas that generate the inclined surfaces having different angles to each other as a reconstructed image.

In order for the position measuring device 1B using such a hologram 21 to measure a position on a surface of a workpiece W, the light receiver 30 captures, through a preselected one of the first area 211 and the second area 212, detection light LS2 caused by the laser light LS1 with which the workpiece W is irradiated.

The angle of the inclined surface of the reconstructed image generated by the hologram 21 is different when the light receiver 30 captures the detection light LS2 through the first area 211 compared to when the light receiver 30 captures the detection light LS2 through the second area 212, so that the range and resolution of position detection is different from each other.

That is, the closer the angle of the inclined surface in the reconstructed image is to being parallel to the optical axis c of the laser light LS1, the larger the range of the position detection. On the other hand, the closer the angle of the inclined surface in the reconstructed image is to being perpendicular to the optical axis c of the laser light LS1, the higher the resolution of the position detection. Accordingly, the range and resolution of the position detection for the workpiece W can be selected depending on whether the detection light LS2 pass through the first area 211 or the second area 212 of the hologram 21.

In the position measuring device 1B, the drive mechanism 60 can change the position of the hologram 21. For example, the position of the workpiece W is first measured using the first area 211 of the hologram 21 as illustrated in FIG. 6A. Thereafter, the drive mechanism 60 moves the position of the hologram 21 and the position of the workpiece W is measured using the second area 212 as illustrated in FIG. 6B. Thus, the range and resolution to measure the position of the workpiece W can be switched.

While the example in which the hologram 21 has two areas, the first area 211 and the second area 212, is described in the present embodiment, a hologram may have three or more areas configured to generate respective reconstructed images of inclined surfaces having different angles to one another.

Third Embodiment

A position measuring device according to a third embodiment will now be described.

Figure 7:
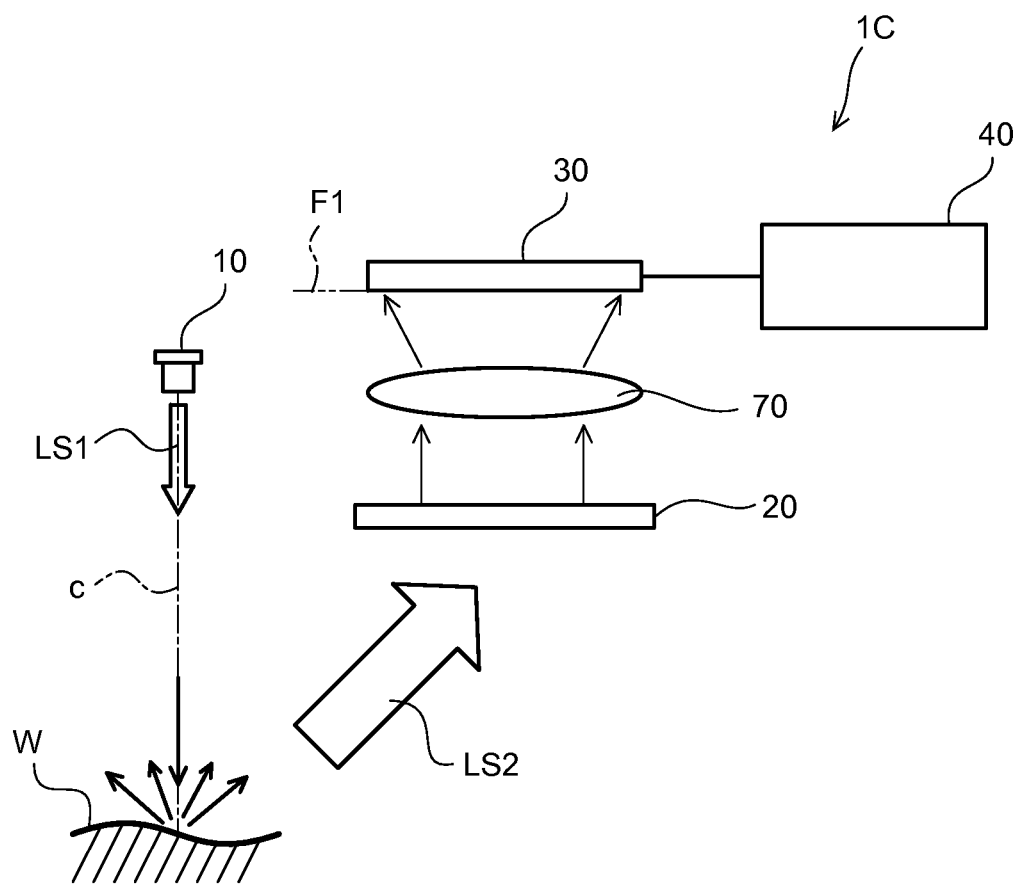
FIG. 7 is a configuration diagram illustrating a position measuring device according to a third embodiment.
Figure 8:
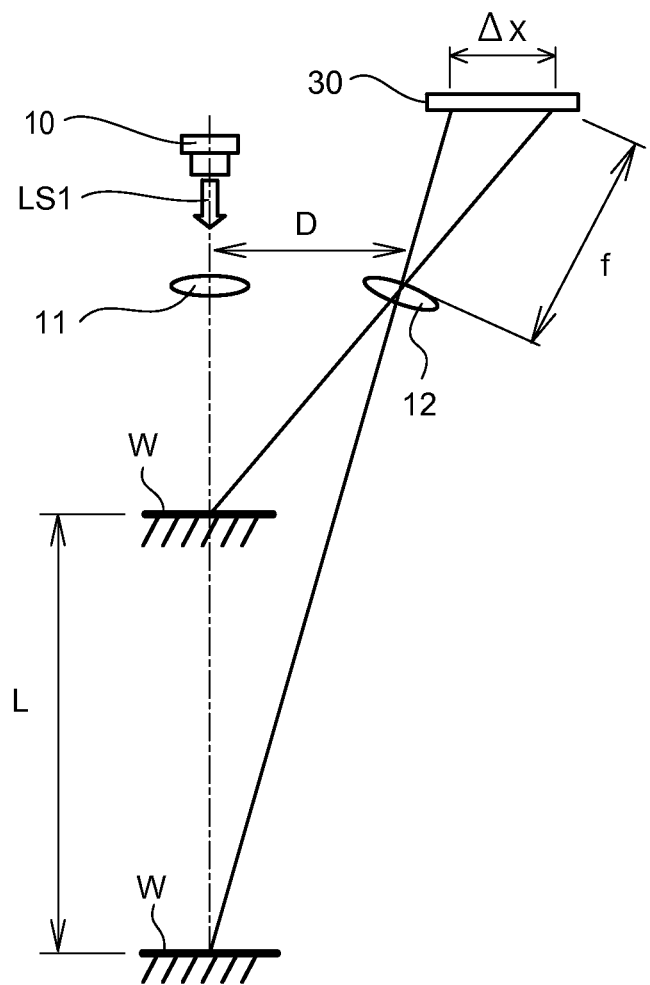
FIG. 8 is a schematic diagram illustrating a non-contact position measuring device using triangulation.

FIG. 7 is a configuration diagram illustrating a position measuring device according to the third embodiment.

As illustrated in FIG. 7, a position measuring device 1C includes a lens 70 between the hologram 20 and the light receiver 30. Other configurations are the same as the position measuring device 1 according to the first embodiment.

The lens 70 has a characteristic of expanding the reconstructed image generated by the hologram 20. Such a lens 70 allows the light receiver 30 to capture a change in the image position of the hologram 20 associated with a change in the position of the workpiece W under magnification when the position of the workpiece W is measured. This makes it possible to detect a small height change in the position of the workpiece W with high accuracy.

As described above, the position measuring devices 1, 1B, and 1C according to the embodiments can measure the position of the surface of the measurement object in a short period of time with a simple and compact structure.

While the embodiments and their application examples have been described above, the present invention is not limited thereto. For example, the above-mentioned embodiments or their application examples which components are added to or deleted from or whose components are modified in design by those skilled in the art are within the scope of the invention as long as they fall within the spirit of the invention.

INDUSTRIAL APPLICABILITY

The present invention is preferably applicable to an arm-type position measuring device and an image measurement device in which a measuring head 100 moves linearly along each of the x-, y-, and z-axes.

What is claimed is:

1. A position measuring device comprising:
a light emitter configured to emit a laser light;
a hologram configured to generate a reconstructed image of an inclined surface relative to an optical axis;
a light receiver disposed on a reconstructed image forming surface of the hologram; and
a measurement unit configured to measure a position of an object based on a position of light received by the light receiver.

2. The position measuring device according to claim 1, wherein
the light emitter emits a linear laser light, and
the light receiver includes an image sensor having a two-dimensional array of pixels.

3. The position measuring device according to claim 2, further comprising a scanning unit configured to move a relative position between the laser light and the object in a direction perpendicular to a direction in which a line of the laser light extends.

4. The position measuring device according to claim 1, further comprising a movable mirror that scans the laser light emitted from the light emitter over the object and adjusts an optical path such that scattered light of the laser light on the object is incident at a certain angle relative to the hologram and is imaged on a line sensor, wherein
the light emitter emits a dot laser light, and
the light receiver includes the line sensor in which a plurality of pixels are arranged in a straight line.

5. The position measuring device according to claim 1, further comprising a lens disposed between the hologram and the light receiver and expands the reconstructed image generated by the hologram.

6. The position measuring device according to claim 1, wherein the hologram includes a first area that reconstructs a first inclined surface inclined at a first angle relative to the optical axis and a second area that reconstructs a second inclined surface inclined at a second angle different from the first angle relative to the optical axis.

* * * * *